Jan. 29, 1952    G. FLEISCHEL    2,583,556
PLANETARY GEAR ARRANGEMENT

Filed March 10, 1949    6 Sheets-Sheet 2

INVENTOR.
GASTON FLEISCHEL
BY

Jan. 29, 1952 G. FLEISCHEL 2,583,556
PLANETARY GEAR ARRANGEMENT
Filed March 10, 1949 6 Sheets-Sheet 3

INVENTOR.
GASTON FLEISCHEL
BY

Jan. 29, 1952  G. FLEISCHEL  2,583,556
PLANETARY GEAR ARRANGEMENT
Filed March 10, 1949  6 Sheets-Sheet 5

INVENTOR.
GASTON FLEISCHEL
BY

Patented Jan. 29, 1952

2,583,556

UNITED STATES PATENT OFFICE 2,583,556

PLANETARY GEAR ARRANGEMENT

Gaston Fleischel, New York, N. Y., assignor to Products & Licensing Corporation, New York, N. Y.

Application March 10, 1949, Serial No. 80,581

14 Claims. (Cl. 74—789)

My present invention relates to planetary gear transmissions.

Such transmissions consist usually of three members, one of which is selected as a driving member, another as a driven member, and the third of which will be called hereinafter the reaction member.

The speed and direction of rotation of the reaction member relative to the rotating driving member determines the ratio of transmissions, i. e. the relation between output speed and input speed. Therefore, the speed and direction of the reaction member has to be effectively controlled.

When more complicated planetary transmissions are used, there may be several reaction members each of which has to be controlled in the same manner.

Planetary gear transmissions of the type described in detail in the present application include usually driving gear means adapted to be connected to a driving shaft, a reaction member provided with gear teeth and arranged coaxially with the above mentioned driving gear means rotatably about the axis of the same, and driven gear means being in mesh with the above mentioned driving gear means and the gear teeth of the reaction member; these driven gear means are adapted to be connected to a driven shaft rotating the same at a speed depending, on the one hand, on the speed of the driving shaft and, on the other hand, on the speed and direction of rotation of the reaction member.

It is an object of my present invention to provide means for either rotating the above mentioned reaction member or positively preventing rotation of the same, e. g. by locking it to a stationary member.

It is another object of my present invention to combine with means of the above defined type safety means preventing simultaneous operation of the rotating and locking means.

Still another object of my present invention is to prevent engagement of the locking means until the reaction member reverses its direction of turning or rotates at the same velocity as the member to which it has to be locked.

With the above objects in view, a preferred embodiment of my present invention consists of a planetary gear arrangement comprising in combination driving gear means adapted to be connected to a driving shaft, a reaction member provided with gear teeth and arranged coaxially with the driving gear means rotatably about the axis of the same, driven gear means being in mesh with the driving gear means and the gear teeth of the reaction member and adapted to be connected with a driven shaft, a rotating sun gear member rotating at a predetermined speed, progressive clutch means between the rotating sun gear member and the reaction member for rotating the reaction member, a stationary member, and means for positively locking the reaction member for preventing rotation of the reaction member, whenever desired.

Instead of using a stationary member and locking means of the above defined type, I may employ also a rotating sun gear member rotating at a predetermined speed, and means for positively locking the rotatable reaction member to the rotating sun gear member, whenever desired.

I wish to note that the term "locking means," as used above and in the following description and claims, is intended to define any positive nonprogressive brake means including teeth, jaws, pawls, or the like, acting in such a way as to rigidly connect or disconnect at will two parts of an arrangement. Both these parts might be rotating in which event the locking device works like a positive clutch, or one might be rotating and the other one might be stationary in which event the locking device works like a positive brake stopping rotation of the rotatable part by rigid connection with the stationary part.

Locking devices of the type used by me have to be adapted to work in both directions of rotation of the rotatable part and, accordingly, one-way clutches and free wheeling devices are not intended to be covered by the term "locking device" as used by me in the specification and claims.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 2 is a vertical section of the lower part of the planetary gear arrangement shown in Fig. 1, with the progressive clutch in engaged operative position and the locking device in disengaged inoperative position;

Figure 1:
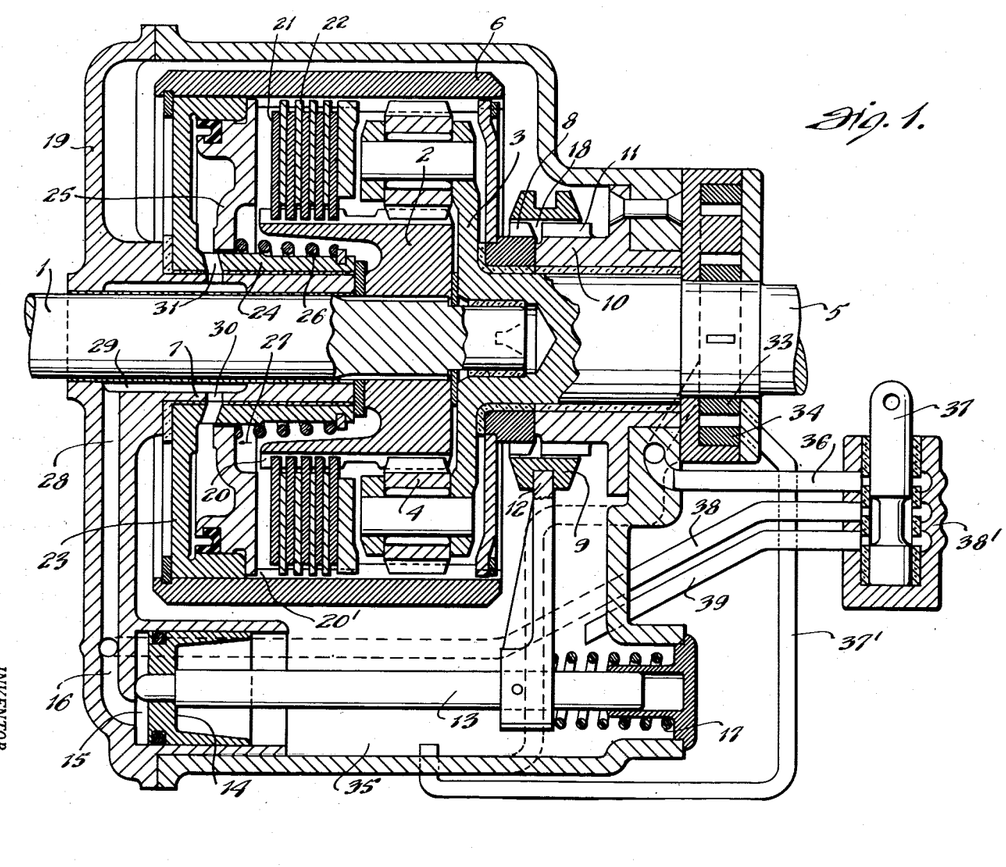
Fig. 1 is a longitudinal section through a preferred embodiment of a planetary gear arrangement according to my present invention with the progressive clutch in released inoperative position and the locking device in engaged operative position.
Figures 3, 6:
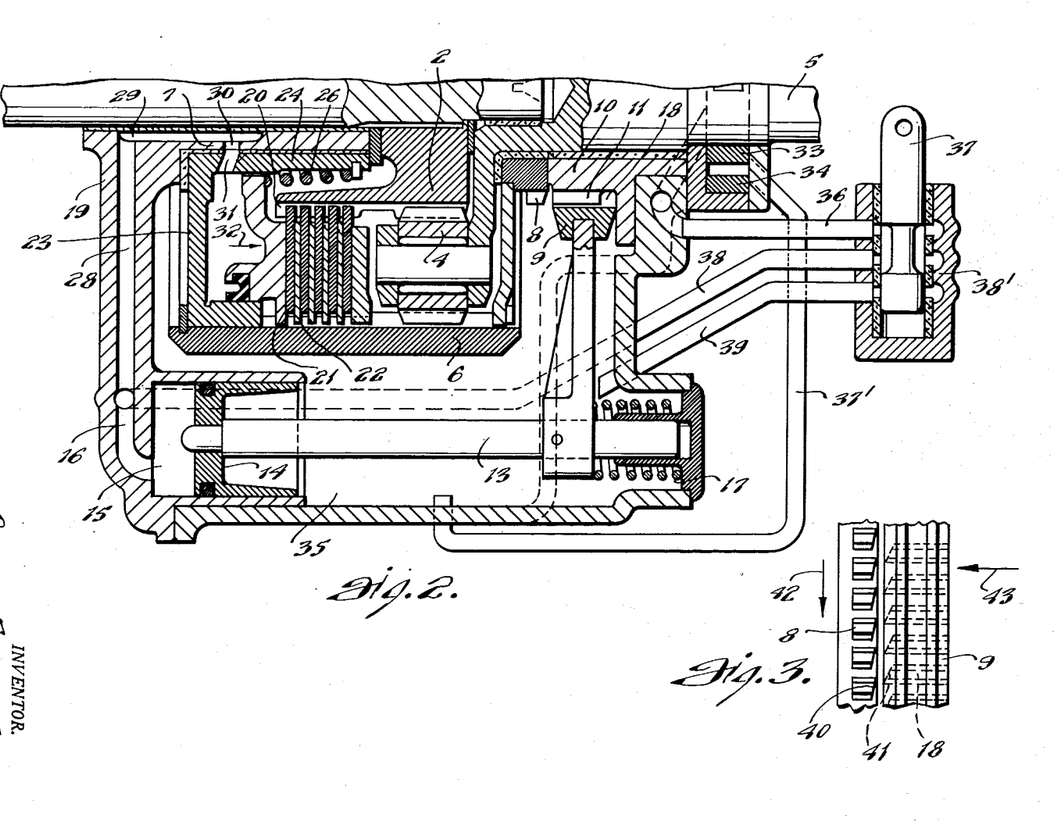
Fig. 3 is a cylindrical development of part of the locking device.
Fig. 6 is a vertical section through the locking device shown in Fig. 4, in engaged operative position.

In the embodiment shown in Figs. 1 to 3, I provide a planetary gear arrangement the main parts of which are the driving shaft 1 which is carrying the sun gear 2. The sun gear 2 and driving shaft 1 are surrounded by the housing 19 which supports shaft 1 by means of hub 7.

Within this housing 19, the internally toothed rotatable ring 6 is arranged, serving as reaction member. This ring 6 is freely rotatably supported by hub 7 of the housing 19. Between the sun gear 2 and ring 6, I arrange the planets 4 rotatably supported by the planet carrier 3 which, in turn, is connected to the driven shaft 5. The planets 4 are in mesh with sun gear 2 and the toothed ring 6, as clearly shown in Fig. 1.

In accordance with my present invention, I provide locking means for positively locking the reaction member, namely ring 6, to a stationary member, namely housing 19. For this purpose, ring 6 is provided with an extension bearing anchoring teeth 8.

Furthermore, I arrange on the housing 19 a hub 10 provided with external teeth 11. I also provide an axially slidable connecting ring 9 provided with connecting internal teeth 18 which are permanently in mesh with the teeth 11 on hub 10 and can be moved into engagement with the teeth 8 of ring 6.

The sliding axial motion of the connecting ring 9, necessary for moving the same between the engaged locking position shown in Figure 1, and the disengaged inoperative position shown in Figure 2, is obtained for instance by means of the fork 12 which is rigidly connected to the shaft 13 slidably supported in axial direction within the housing 19. This shaft 13 is connected, as shown in Figure 1, to piston 14 which, in turn, is slidably arranged in the cylinder 15 forming part of the housing 19 in the embodiment shown in Figures 1 to 3.

As shown in the drawings, I provide also in combination with piston 13 and fork 12 the spring 17 permanently tending to slide fork 12 together with ring 9 and the connecting teeth of the same from inoperative non-locking position into operative engaged position positively locking ring 6 to hub 10 and the stationary housing 19.

The cylinder 15 is connected with conduit 16 by which oil under pressure is forced by means described farther below in detail into the cylinder whenever it is desired to move the same against action of spring 17. Such sliding movement of the piston 14 will result in sliding of fork 12 and movement of the connecting teeth 18 of the connecting ring 9 from their locking position, shown in Figure 1, into their non-locking position shown in Fig. 2.

In addition to the above described parts, I provide as part of my new planetary gear arrangement a progressive clutch composed of the friction discs 21 non-rotatably but slidably carried by the guiding teeth 20 on sun gear 2, and another set of corresponding friction discs 22 slidably carried by guiding teeth 20' provided on the inner cylindrical surface of the rotatable ring 6 serving as reaction member.

To assure the necessary pressure between the alternating discs 21 and 22 and to thus develop the friction necessary to transmit rotative motion from sun gear 2 and shaft 1 driving the sun gear to the rotatable ring 6, this ring is provided with flange 23 and a hub 24; this hub 24 is supported by hub 7 of the housing 19, as explained above. Flange 23 has the shape of an annular cylinder in which the annular piston 25 is slidably arranged.

This piston 25 is maintained in its non-operative position spaced from the sets of discs 21 and 22 by spring 26 permanently tending to move the piston in direction of arrow 27, shown in Figure 1. Thus, the clutch is normally open, i. e. in disengaged non-operating position.

To operate the progressive clutch composed of the sets of friction discs 21 and 22, the space between flange 23 and piston 25 is connected by means of conduits 31, 29, and 28 with a source of oil under pressure which will be described farther below in detail. By admitting oil under pressure through the above mentioned conduits into the oil chamber between flange 23 and piston 25, this piston will be moved from its inoperative position shown in Figure 1 into its operative position shown in Figure 2, pressing the friction discs 21 and 22 against each other so that the clutch formed by these discs is in engaged position and transmits rotative motion from sun gear 2 to ring 6.

In order to force oil under pressure into cylinder 15 for operation of the locking means described above, and into conduit 28 for operation of the progressive clutch also described above, I connect the conduits 16 and 28 by means of the pipe 38 with the distributing valve housing 38' in which the distributing valve 37 is slidably arranged. Furthermore, I provide the return pipe 39 leading into the bottom portion 35 of housing 19.

I also arrange the conduit 37' connected at its one end with bottom portion 35 of housing 19 and at its other end with a gear pump of conventional type. This gear pump consists preferably of an externally toothed pinion 33 mounted on shaft 5 and cooperating with the internally toothed gear ring 34. This gear pump pumps the oil from the bottom portion 35 of the housing through pipes 37' and 36 into the valve housing 38' maintaining therein the required oil pressure.

The control means described above are operated as follows:

If the valve is in its lowermost position shown in Figure 1, the pressure pipe 36 is closed and pressure oil can freely flow from conduits 16 and 28 through pipe 38 into pipe 39, and return through the same into the bottom portion 35 of housing 19. Under such conditions, no pressure is exerted upon the pistons 14 and 25 and the same can be forced by the springs 17 and 26, respectively, into direction of arrow 27. Such movement of the pistons 14 and 25 will result in sliding of the locking device into engaged position and disengagement of the progressive clutch discs, as shown in Figures 1 and 2. Consequently, in this condition, the ring 6 is positively locked to the stationary hub 10, forming part of the stationary housing 19.

When the valve member 37 is moved upward, into its position shown in Figure 2, the return pipe 39 is closed and pressure oil is admitted through pipes 36 and 38 into the conduits 16 and 28, forcing both pistons 14 and 25 to slide against direction of arrow 27 into their position shown in Figure 2.

In this position, the locking device is disengaged and the progressive clutch is engaged, rotating ring 6 at the speed of sun gear 2 and of shaft 1 driving the same.

It is evident that the connecting teeth 18 of the locking device, which are only slidable in axial direction but not rotatable, are not able to properly engage the teeth 8 on the rotating ring 6 until this ring 6 has the same speed as the connecting teeth 18, i. e. until the speed of rotation of these teeth decreases to zero. This occurs, of course, only at that moment when the ring 6 reverses its direction of rotation, i. e. when the speed of the driving shaft 1 becomes lower than the speed of the driven shaft 5. Of course the velocity of the ring 6 is zero also when both the driving and driven shafts are in standstill.

In order to prevent engagement of the teeth 8 and 18 at any other moment, i. e. while the teeth 8 are rotating at a considerable speed, I found it advisable to provide both sets of teeth 8 and 18 with chanfered opposed faces 40 and 41, respectively, as shown in Fig. 3. It is evident that while the teeth 8 rotate in direction of arrow 42, even strong pressure on the teeth 18 in direction of arrow 43 by means of spring 17 will not result in engagement of the sets of teeth 8 and 18 but in periodic repulsion of the teeth 18 against action of spring 17. This will continue until the teeth 8 are substantially at standstill, at which moment the teeth 18 will enter between the teeth 8 positively locking the same and ring 6 to the stationary teeth 11 mounted on hub 10 of the stationary housing 19.

In some arrangements, it is desirable to further improve engagement of the rotating teeth 8 and the slidable teeth 18 of the connecting member 9, i. e. to prevent any unintentional engagement of the same. This can be obtained particularly well by the synchronizer means shown in Figures 4 to 7. These synchronizer means are shown as a modification of the locking means shown in Figures 1 to 3, without any change of the other parts of the general arrangement. Consequently, all unchanged parts of the arrangement are designated in Figures 4 to 7 with the same reference numerals as in Figures 1 to 3.

In the combined locking and synchronizer arrangement shown in Figures 4, 4a, 5, 6 and 7, the teeth 8' are similar to the teeth 8 shown in Figure 3. These teeth 8' are connected to the reaction ring 6 as described above.

A difference between the arrangement shown in Figures 1 to 3 and the arrangement shown in Figures 4 to 7 is that in the combined locking and synchronizer device shown in Figures 4 to 7 the hub 10' forming part of the housing 19 is slightly longer than the hub 10 shown in Figures 1 and 2. Similarly, the external teeth 11' provided on hub 10' are slightly longer than the external teeth 11 provided on hub 10 shown in Figures 1 and 2.

Figure 4:
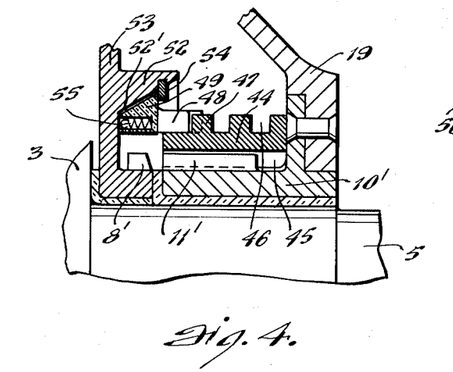
Fig. 4 is a vertical section through a combined locking and synchronizing device usable in the arrangement shown in Figs. 1 to 3, but provided with synchronizer means, in disengaged inoperative position.
Figure 4A:
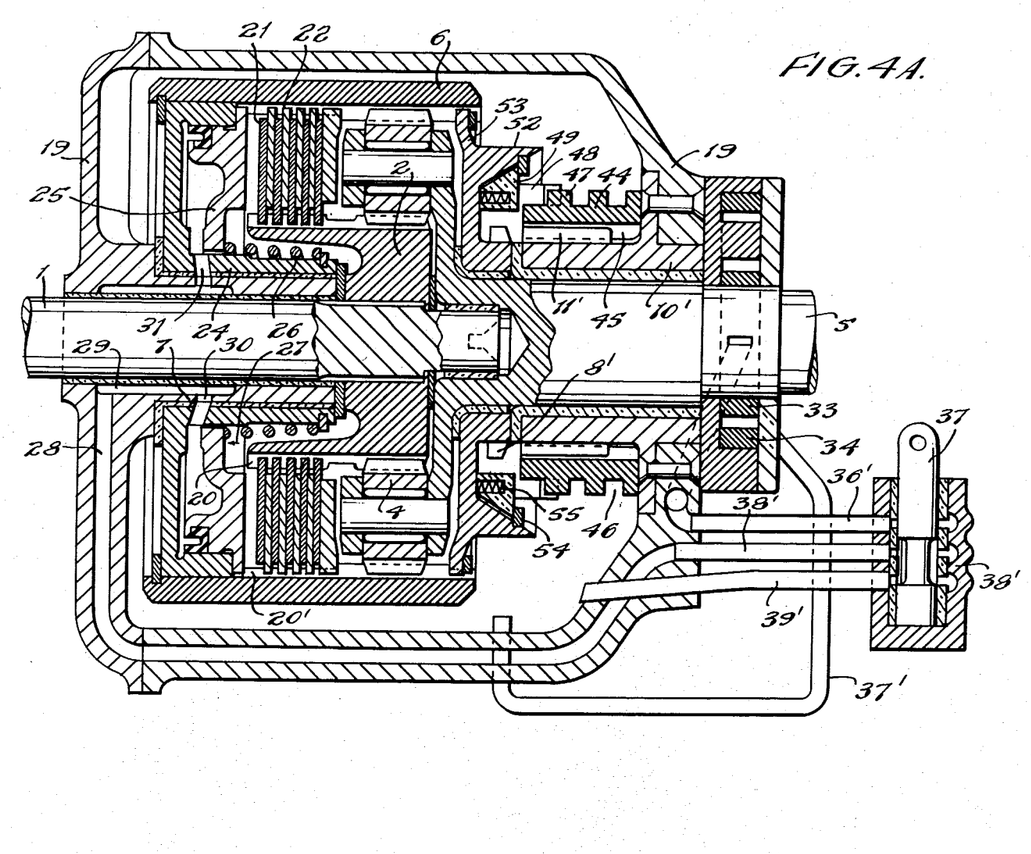
Fig. 4A is a longitudinal section through a complete planetary gear arrangement embodying the locking and synchronizing device of Fig. 4 with its synchronizer means.

Furthermore, the connecting ring 44 is substantially longer than the connecting ring 9 and provided with connecting teeth 45 having a greater length than the connecting teeth 18. The connecting ring 44 is arranged slidably in axial direction of shaft 5 and movable in such axial direction by means of fork 12' which is similar to the operating fork 12 shown in Figures 1 and 2. This fork 12' engages the fork way 46 provided in the outer cylindrical surface of the connecting ring 44.

Figure 5:
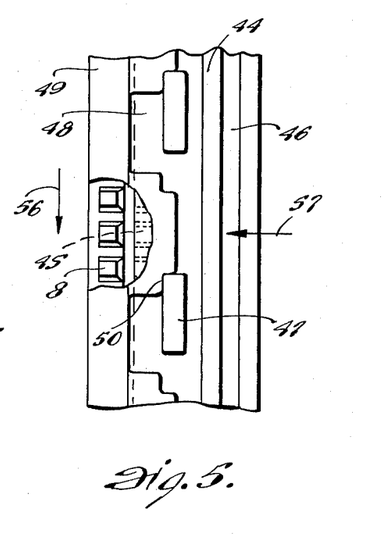
Fig. 5 is a cylindrical development of the locking and synchronizer means shown in Fig. 4 with parts broken away, in disengaged inoperative position.
Figure 6:
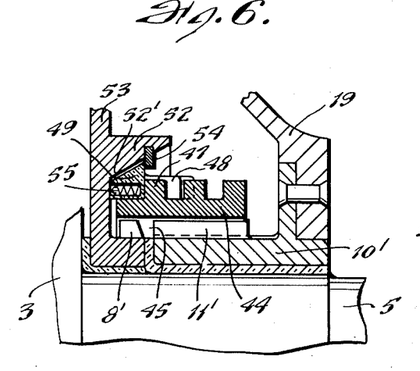

The connecting ring 44 is furthermore provided on its outer cylindrical face with synchronizing teeth 47, the shape of which is clearly shown in Figure 5. These synchronizing teeth 47 cooperate with corresponding openings 48 provided with shoulders 50 cut in the cylindrical hub of the friction cone 49, clearly shown in Figure 4.

This cone 49 is arranged within and cooperating with the surface of a corresponding conical hole 52' provided in an axial extension 52 of flange 53 forming part of ring 6. A snap ring 54 prevents unintentional sliding out of cone 49 from the corresponding conical hole 52'.

Within cone 49, small holes are provided in which the frictional springs 55 are arranged. These springs permanently tend to move cone 49 against direction of arrow 57 indicated in Figure 5.

The above described locking and synchronizer means operate as follows:

When the friction discs 21 and 22 of the progressive clutch are engaged, the locking device shown in Figures 4 to 7 is held in its disengaged non-locking position by hydraulic pressure as described above in detail, and the various elements of the locking and synchronizer means are in the position shown in Figure 5. In this position, the flange 53 together with its axial extension 52' rotates at the speed of the driving shaft 1 as indicated by arrow 56; this is due to the fact that flange 53 is part of ring 6 serving as reaction member, which ring is connected by means of the engaged progressive clutch to the driving member.

During turning of the cone 49, the external teeth 47 provided on the connecting ring 44 engage the shoulders 50 of the teeth 48 provided in cone 49. Such engagement of the teeth 47 by the shoulders 50 prevents these teeth from moving into engagement with the teeth 48 despite exertion of pressure in direction of arrow 57. Such pressure in direction of arrow 57 is exerted by spring 17, as described above in detail. It is evident that any increase in pressure in direction of arrow 57 only increases the friction between teeth 47 and shoulders 50, ensuring engagement of the same and preventing the teeth 47 from engaging teeth 48.

Consequently, during rotation of ring 6 and flange 53, engagement of the synchronizer teeth 47 and 48 is impossible. Therefore, during such rotation, the connecting teeth 45 on the connecting ring 44 cannot move in direction of arrow 57 and cannot engage teeth 8' provided on flange 53 firmly locking the same and ring 6 to the stationary housing 19.

When the hydraulic pressure is released as described above, the progressive clutch is automatically disengaged and the speed of rotation of ring 6 decreases. Simutaneously, spring 17 will be free to move the connecting ring 44 in direction of arrow 57.

The moment the speed of ring 6 becomes zero, e. g. the moment this ring reverses its direction of rotation, the relative speed between ring 6 and housing 19 is also zero. At this moment, the connecting ring 44 turns slightly relative to flange 53, resulting in disengagement of teeth 47 from the shoulders 50 and permitting the teeth 47 to slide into their position shown in Figures 6 and 7 engaging the teeth 48. In this position, the connecting teeth 45 of the connecting ring 44 engage both the set of teeth 11' provided on hub 10' of the stationary housing 19 as well as teeth 8' provided on flange 53 of ring 6 positively locking the same to the stationary housing and preventing its further turning.

Figure 7:
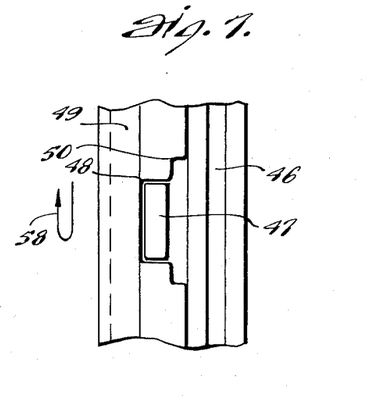
Fig. 7 is a cylindrical development of the locking device shown in Figs. 4 to 6, in engaged operative position.

Disengagement of the combined locking and synchronizer means, i. e. their movement from their position shown in Figures 6 and 7, into their position shown in Figures 4 and 5, and simultaneous engagement of the friction discs 21 and 22 of the progressive clutch is attained by moving the valve member 37 upward, thus applying hydraulic pressure as described above in detail.

In the modified planetary gear arrangement shown in Figures 8 to 11, combined hydraulic operating means are provided for simultaneously operating the progressive clutch and the locking device.

Figure 8:
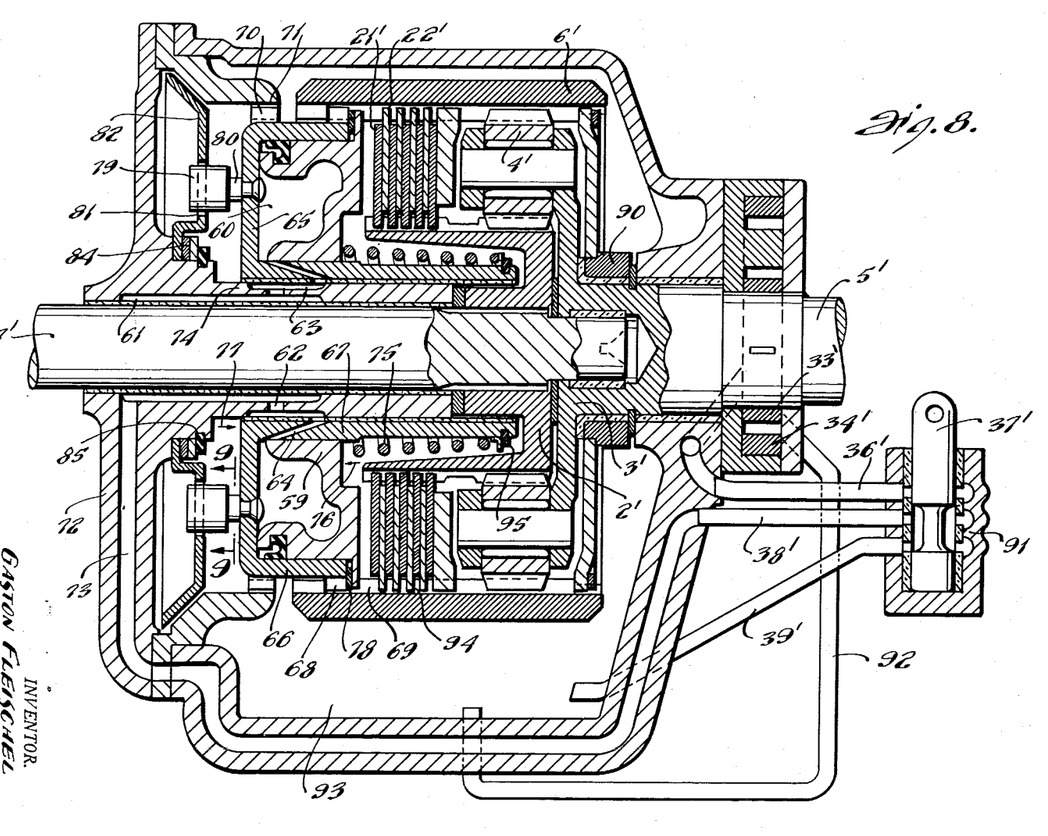
Fig. 8 is a vertical section through another planetary gear arrangement according to my present invention with the progressive clutch in disengaged inoperative position, and the locking device in engaged operative position.

Also in this arrangement, a driving shaft 7' and a sun gear 2' are provided. This sun gear 2' cooperates with the planet gears 4' mounted on the planet carrier 3' firmly secured to the driven shaft 5'. The planet gears 4' are in mesh with the internal teeth 69 of reaction ring 6', which is freely turnably supported at its right hand end by hub 90 and at its left hand end by the piston 59 and by teeth 68 mounted on the sliding cylinder 65 and engaging the teeth 69 on ring 6'.

Actually, reaction ring 6' is not turnable relative to the sliding cylinder 65 and piston 59 but the same are turning—due to their engagement with the teeth 69—together with ring 6'.

Cylinder 65 includes the cylindrical wall 66 carrying the teeth 68 and a hub 67 rotatably supported by hub 74 of the gear housing 72.

Piston 59 is freely slidably supported by the cylindrical wall 66 and hub 67 of the cylinder 65, slidably in direction of arrows 76 and 77 relative to the cylinder.

Between the piston 59 and cylinder 65 an oil chamber 63 is formed which is connected by means of conduit 64 in hub 67 of cylinder 65, chamber 63 and hole 62 in hub 74 of housing 72, chamber 63 and conduit 73 in the wall of housing 72 and pipe 38' with the valve housing 91.

Within this valve housing 91 the valve 37' is arranged and operates in the same manner as valve 37 operates in the arrangement shown in Figures 1 to 3. Valve housing 91 is connected by pipe 36' with the gear pump consisting of the gears 33' and 34', and this gear pump is connected by means of pipe 92 with the bottom 93 of the housing 72. A return pipe 39' serves for returning pressure oil from the valve housing 91 into the bottom portion 93 of housing 72.

The friction discs 21' and 22' of the progressive clutch 94 are arranged between the teeth 69 of ring 6' and the teeth of the sun gear 2' in the same manner as in the embodiment shown in Figures 1 to 3. They can be pressed against each other by means of the piston 59 when the same is forced by hydraulic pressure in direction of arrow 77, as will be described farther below in detail.

Spring 75 is arranged between piston 59 and stop 95 provided on hub 67 of cylinder 65 permanently forcing the cylinder in direction of arrow 77 and the piston in direction of arrow 76. Sliding movement of these parts is limited by stop 78 provided on ring 6', as clearly shown in Figures 8 and 10.

Furthermore, on the cylindrical wall 66 of cylinder 65 the locking teeth 70 are arranged which serve as positive brake and are adapted to engage during sliding the stationary locking teeth 71 provided on the stationary housing 72.

In order to enable proper operation of this locking brake arrangement, I provide also synchronizer means which include a friction cone 82 freely rotatably supported by housing 72. A slight friction between the supporting portion of the housing and the friction cone 82 is maintained by a corrugated or conical washer 84 maintained in place by snap ring 85. This friction cone 82 is movable against action of the corrugated or conical washer 84 in direction of arrow 77 with its conical friction face in contact with the corresponding friction face 83 provided on housing 72.

Friction cone 82 is provided with a plurality of holes 81 which are permanently engaged by knobs mounted on the slidable cylinder 65. These knobs are composed of knob heads 79 carried by knob stems 80 having a smaller diameter than the knob heads 79.

My above described arrangement operates as follows:

When valve member 37' is located in its lowermost position shown in Figure 8, pipe 38' is not connected with the pressure pipe 36', and, therefore, no hydraulic pressure is exerted upon cylinder 65 and piston 59. In this condition, spring 75 forces the two members mentioned above toward each other so that the progressive clutch 94 is in disengaged position and the positive brake means composed of the sets of teeth 70 and 71 are in engaged position.

Figures 9, 10, 11:
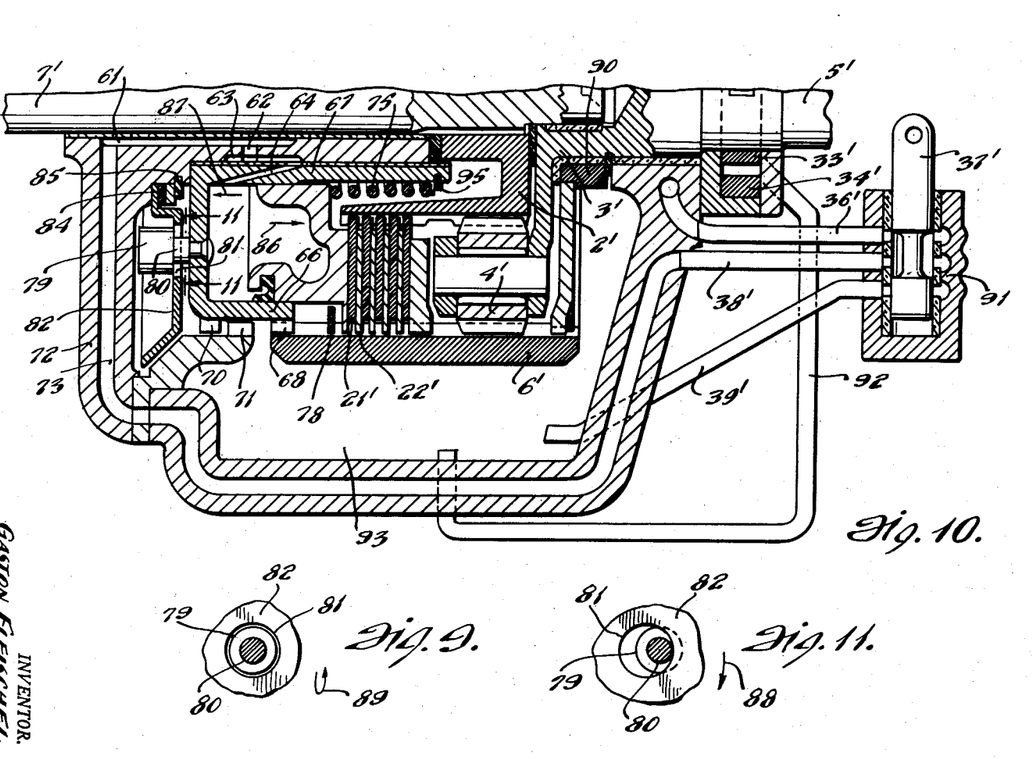
Fig. 9 is a cross section through the synchronizer means forming part of the locking device employed in the arrangement shown in Fig. 8 in synchronized position, along line 9—9 of Fig. 8.
Fig. 10 is a vertical section through the lower part of the planetary gear arrangement shown in Fig. 8, with the progressive clutch in engaged operative position, and the locking device in disengaged inoperative position.
Fig. 11 is a cross section through the synchronizer means shown in Fig. 9, along line 11—11 of Fig. 10, in non-synchronized position.

When the valve member 37' is moved upward into its position shown in Figure 10, oil under pressure is forced into the oil chamber 60, moving cylinder 65 in direction of arrow 76 and piston 59 in direction of arrow 77. This results in engagement of clutch 94 and disengagement of the locking teeth 70 and 71, as clearly shown in Figure 10.

If it is now desired to disengage clutch 94 and engage the locking teeth 70 and 71, the valve member 37 is again moved into its lower position. This will result in draining of the pressure oil from chamber 60 and enable spring 75 to move piston 59 in direction of arrow 76.

However, movement of cylinder 65 in direction of arrow 77 is blocked by the knob heads 79 of the synchronizer knobs which engage the corresponding holes 81 in friction cone 82, as shown in Figure 11. Such engagement is due to the fact that cylinder 65 together with knob heads 79 rotates in direction of arrow 88, rotating also the friction cone 82.

Free turning of cone 82 is, on the one hand, prevented by the corrugated washer 84, and on the other hand by its engagement with the conical friction face 83 of housing 72.

Due to release of clutch 94, the speed of ring 6' and cylinder 65 will slow down until they are at a standstill for one moment, whereafter they reverse their direction of turning, as indicated by arrow 89 in Figure 9. During such reversal of direction of turning, the knob heads 79 will turn relative to the friction cone 82 into the position shown in Figure 9, permitting spring 75 to retract them into their position shown in Figure 8. Such retraction of the knobs will, of course, be accompanied by sliding of cylinder 65 in direction of arrow 77 and engagement of teeth 70 mounted on the cylinder with the teeth 71 mounted on the stationary housing 72, causing positive locking of ring 6' connected by means of teeth 68 and 69 to cylinder 65.

It will be understood that each of the elements described above, or two or more together, may also find a useful application in other types of gear transmissions, differing from the types described above.

While I have illustrated and described the invention as embodied in planetary gear transmissions, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. A planetary gear transmission arrangement comprising in combination driving gear means including a rotating sun gear member adapted to be connected to a driving shaft; a reaction member provided with gear teeth and arranged coaxially with said driving gear means rotatably about the axis of the same; driven gear means being in mesh with said driving gear means and said gear teeth of said reaction member and adapted to be connected with a driven shaft; said rotating sun gear member rotating at a predetermined speed; progressive clutch means arranged between said rotating sun gear member and said reaction member arranged movably between inoperative position establishing no driving connection between said rotating sun gear member and said reaction member, and operative position causing rotation of said reaction member by said rotating sun gear member; pressure operated means for moving said progressive clutch means from inoperative into operative position, at will; a stationary member; means for positively locking said reaction member to said stationary member for preventing rotation of said reaction member, including locking teeth on said reaction member and an axially shiftable locking member having corresponding locking teeth meshing with the locking teeth on both members in one axially shifted position but in another shifted position being free of the locking teeth of one of said members; and synchronizer means combined with said locking means permitting operation of said locking means and consecutive locking of said reaction member to said stationary member only when said locking means are in potentially operative position and said reaction member reverses its direction of rotation, said synchronizer means including engagement means on said reaction member, and corresponding engagement means on said axially shiftable locking member registering with the engagement means on said reaction member exclusively in predetermined rotated positions of said reaction member with respect to said stationary member and axially shiftable locking member.

2. A planetary gear transmission arrangement comprising in combination driving gear means including a rotating sun gear member adapted to be connected to a driving shaft; a reaction member provided with gear teeth and arranged coaxially with said driving gear means rotatably about the axis of the same; driven gear means being in mesh with said driving gear means and said gear teeth of said reaction member and adapted to be connected with a driven shaft; said rotating sun gear member rotating at a predetermined speed; progressive clutch means arranged between said rotating sun gear member and said reaction member arranged movably between inoperative position establishing no driving connection between said rotating sun gear member and said reaction member, and operative position causing rotation of said reaction member by said rotating sun gear member; means for moving said progressive clutch means from inoperative into operative position, whenever desired; a stationary member; locking means movable between inoperative position permitting free rotation of said reaction member, and operative position non-rotatably locking said reaction member to said stationary member including locking teeth on said reaction member and an axially shiftable locking member having corresponding locking teeth meshing with the locking teeth on both members in one axially shifted position but in another shifted position being free of the locking teeth of one of said members; synchronizer means combined with said locking means permitting operation of said locking means and consecutive locking of said reaction member to said stationary member only when said locking means are in potentially operative position and said reaction member reverses its direction of rotation, said synchronizer means including engagement means on said reaction member, and corresponding engagement means on said axially shiftable locking member registering with the engagement means on said reaction member exclusively in predetermined rotated positions of said reaction member with respect to said stationary member and axially shiftable locking member; spring means permanently tending to move said locking means from inoperative into operative position; and means for moving said locking means from operative into inoperative position, whenever desired.

3. A planetary gear transmission arrangement comprising in combination driving gear means including a rotating sun gear member adapted to be connected to a driving shaft; a reaction member provided with gear teeth and arranged coaxially with said driving gear means rotatably about the axis of the same; driven gear means being in mesh with said driving gear means and said gear teeth of said reaction member and adapted to be connected with a driven shaft; said rotating sun gear member rotating at a predetermined speed; progressive clutch means arranged between said rotating sun gear member and said reaction member arranged movably between inoperative position establishing no driving connection between said rotating sun gear member and said reaction member, and operative position causing rotation of said reaction member by said rotating sun gear member; a stationary member; locking means movable between inoperative position permitting free rotation of said reaction member, and operative position non-rotatably locking said reaction member to said stationary member including locking teeth on said reaction member and an axially shiftable locking member having corresponding locking teeth meshing with the locking teeth on both members in one axially shifted position but in another shifted position being free of the locking teeth of one of said members; synchronizer means combined with said locking means permitting operation of said locking means and consecutive locking of said reaction member to said stationary member only when said locking means are in potentially operative position and said reaction member reverses its direction of rotation, said synchronizer means including engagement means on said reaction member and corresponding engagement means on said axially shiftable locking member registering with the engagement means on said reaction member exclusively in predetermined rotated positions of said reaction member with respect to said stationary member and axially shiftable locking member; common spring means permanently tending to move said progressive clutch means from operative into inoperative position and said locking means from inoperative into operative position; and common operating means for simultaneously moving against action of said common spring means said progressive clutch means into operative position and said locking means into inoperative position, whenever desired.

4. A planetary gear transmission arrangement comprising in combination a driving shaft; driving gear means driven by said driving shaft; a rotatable reaction member provided with gear teeth; driven gear means being in mesh with said driving gear means and said gear teeth of said rotatable reaction member; a driven shaft driven by said driven gear means; hydraulically operated progressive clutch means between said driving shaft and said rotatable reaction member; a positive brake for positively stopping rotation of said rotatable reaction member; operating means for simultaneously moving said progressive clutch means from non-operative into operative position and said positive brake from operative into non-operative position; means permanently tending to move said progressive clutch means from operative into non-operative position and said positive brake from non-operative into operative position; and means for retarding the locking of said reaction member to said stationary member until said reaction member attains a predetermined position with respect to said stationary member.

5. A planetary gear transmission arrangement comprising in combination a driving shaft; driving gear means driven by said driving shaft; a rotatable reaction member provided with gear teeth; driven gear means being in mesh with said driving gear means and said gear teeth of said rotatable reaction member; a driven shaft driven by said driven gear means; pressure operated progressive clutch means between said driving shaft and said rotatable reaction member; a positive brake for positively stopping rotation of said rotatable reaction member, whenever desired including locking teeth on said reaction member and an axially shiftable locking member having corresponding locking teeth meshing with the locking teeth on both members in one axially shifted position but in another shifted position being free of the locking teeth of one of said members; and synchronizer means permitting stopping of said rotatable reaction member by said positive brake only at the moment said rotatable reaction member reverses its direction of rotation, said synchronizer means including engagement means on said reaction member and corresponding engagement means on said axially shiftable locking member registering with the engagement means on said reaction member exclusively in predetermined rotated positions of said reaction member with respect to said stationary member and axially shiftable locking member.

6. A planetary gear transmission arrangement comprising in combination a driving shaft; driving gear means driven by said driving shaft; a rotatable reaction member provided with gear teeth; driven gear means being in mesh with said driving gear means and said gear teeth of said rotatable reaction member; a driven shaft driven by said driven gear means; pressure operated progressive clutch means between said driving shaft and said rotatable reaction member; a positive brake for positively stopping rotation of said rotatable reaction member including locking teeth on said reaction member and an axially shiftable locking member having corresponding locking teeth meshing with the locking teeth on both members in one axially shifted position but in another shifted position being free of the locking teeth of one of said members; operating means for simultaneously moving said progressive clutch means from non-operative into operative position and said positive brake from operative into non-operative position, and vice versa; and synchronizer means permitting movement of said positive brake from non-operative into operative position only at the moment said rotatable reaction member reverses its direction of rotation, said synchronizer means including engagement means on said reaction member and corresponding engagement means on said axially shiftable locking member registering with the engagement means on said reaction member exclusively in predetermined rotated positions of said reaction member with respect to said stationary member and axially shiftable locking member.

7. A planetary gear transmission arrangement comprising in combination a driving shaft; driving gear means driven by said driving shaft; a rotatable reaction member provided with gear teeth; driven gear means being in mesh with said driving gear means and said gear teeth of said rotatable reaction member; a driven shaft driven by said driven gear means; pressure operated progressive clutch means between said driving shaft and said rotatable reaction member; a positive brake for positively stopping rotation of said rotatable reaction member including locking teeth on said reaction member and an axially shiftable locking member having corresponding locking teeth meshing with the locking teeth on both members in one axially shifted position but in another shifted position being free of the locking teeth of one of said members; operating means for simultaneously moving said progressive clutch means from non-operative into operative position and said positive brake from operative into non-operative position; means permanently tending to move said progressive clutch means from operative into non-operative position and said positive brake from non-operative into operative position; and synchronizer means permitting movement of said positive brake from non-operative into operative position only at the moment said rotatable reaction member reverses its direction of rotation, said synchronizer means including engagement means on said reaction member and corresponding engagement means on said axially shiftable locking member registering with the engagement means on said reaction member exclusively in predetermined rotated positions of said reaction member with respect to said stationary member and axially shiftable locking member.

8. A planetary gear transmission arrangement comprising in combination driving gear means including a rotating sun gear member adapted to be connected to a driving shaft; a reaction member provided with gear teeth and arranged coaxially with said driving gear means rotatably about the axis of the same; driven gear means being in mesh with said driving gear means and said gear teeth of said reaction member and adapted to be connected with a driven shaft; said rotating sun gear member rotating at a predetermined speed; progressive clutch means arranged between said rotating sun gear member and said reaction member arranged movably between inoperative position establishing no driving connection between said rotating sun gear member and said reaction member, and operative position causing rotation of said reaction member by said rotating sun gear member; pressure operated means for moving said progressive clutch means from inoperative into operative position, at will; a stationary member; positive locking means movable between inoperative position permitting free rotation of said reaction member, and operative position non-rotatably locking said reaction member to said stationary member; spring means permanently tending to move said positive locking means from inoperative into operative position; and means for moving said locking means from operative into inoperative position, with simultaneous movement of said progressive clutch means from inoperative to operative position.

9. A planetary gear transmission arrangement comprising in combination driving gear means adapted to be connected to a driving shaft and including a rotating member; a rotatable reaction member provided with gear teeth and arranged coaxially with said driving gear means rotatably about the axis of the same; driven gear means being in mesh with said driving gear means and said gear teeth of rotatable reaction member and adapted to be connected with a driven shaft; progressive clutch means between said driving shaft and said rotatable reaction member for rotating said rotatable reaction member; a braking member; and locking means for positively locking said rotatable reaction member to said braking member; and means preventing locking of said rotatable reaction member to said braking member until said rotatable reaction member attains a speed substantially equal to the speed of said braking member.

10. A planetary gear transmission arrangement comprising in combination driving gear means adapted to be connected to a driving shaft and including a rotating member; a rotatable reaction member provided with gear teeth and arranged coaxially with said driving gear means rotatably about the axis of the same; driven gear means being in mesh with said driving gear means and said gear teeth of said rotatable reaction member and adapted to be connected with a driven shaft; progressive clutch means between said driving shaft and said rotatable reaction member for rotating said rotatable reaction member; a braking member; non-progressive positive clutch means for positively locking said rotatable reaction member to said braking member, whenever desired; operating means for simultaneously moving said progressive clutch means from disengaged into engaged position and said non-progressive positive clutch means from engaged into disengaged position; and pressure means permanently tending to move said progressive clutch means from engaged into disengaged position and said non-progressive positive clutch means from disengaged into engaged position.

11. A planetary gear transmission arrangement comprising in combination driving gear means adapted to be connected to a driving shaft and including a rotating member; a rotatable reaction member provided with gear teeth and arranged coaxially with said driving gear means rotatable about the axis of the same; driven gear means being in mesh with said driving gear means and said gear teeth of said rotatable reaction member and adapted to be connected with a driven shaft; progressive clutch means between said driving shaft and said rotatable reaction member for rotating said rotatable reaction member; a braking member; non-progressive positive clutch means for positively locking said rotatable reaction member to said braking member, whenever desired; and synchronizer means permitting movement of said positive clutch means into positively locking position only at the moment when the speed of said rotatable reaction member is equal to the speed of said braking member.

12. A planetary gear transmission arrangement comprising in combination driving gear means adapted to be connected to a driving shaft and including rotating member; a rotatable reaction member provided with gear teeth and arranged coaxially with said driving gear means rotatably about the axis of the same; driven gear means being in mesh with said driving gear means and said gear teeth of said rotatable reaction member and adapted to be connected with a driven shaft; progressive clutch means between said driving shaft and said rotatable reaction member for rotating said rotatable reaction member; a braking member; non-progressive positive clutch means for positively locking said rotatable reaction member to said braking member, whenever desired; operating means for simultaneously moving said progressive clutch means from disengaged into engaged position and said non-progressive positive clutch means from engaged into disengaged position, and vice versa; and synchronizer means permitting movement of said non-progressive positive clutch means from disengaged into engaged position only at the moment when the speed of said rotatable reaction member is substantially equal to the speed of said braking member.

13. A planetary gear transmission arrangement comprising in combination driving gear means adapted to be connected to a driving shaft and including a rotating member; a rotatable reaction member provided with gear teeth and arranged coaxially with said driving gear means rotatably about the axis of the same; driven gear means being in mesh with said driving gear means and said gear teeth of said rotatable reaction member and adapted to be connected with a driven shaft; progressive clutch means between said driving shaft and said rotatable reaction member for rotating said rotatable reaction member; a braking member; non-progressive positive clutch means for positively locking said rotatable reaction member to said braking member, whenever desired; operating means for simultaneously moving said progressive clutch means from disengaged into engaged position and said non-progressive positive clutch means from engaged into disengaged position; pressure means permanently tending to move said progressive clutch means from engaged into disengaged position and said non-progressive positive clutch means from disengaged into engaged position; and synchronizer means permitting movement of said non-progressive positive clutch means from disengaged into engaged position only at the moment when the speed of said rotatable reaction member is substantially equal to the speed of said braking member.

14. A planetary gear transmission arrangement comprising in combination driving gear means adapted to be connected to a driving shaft and including a rotating member; a reaction member provided with gear teeth and arranged coaxially with said driving gear means rotatably about the axis of the same; driven gear means being in mesh with said driving gear means and said gear teeth of said reaction member and adapted to be connected with a driven shaft; progressive clutch means arranged between said rotating member and said reaction member arranged movably between an inoperative position establishing no driving connection between said rotating member and said reaction member, and an operative position causing rotation of said reaction member by said rotating member; a stationary member; locking means movable between an inoperative position permitting free rotation of said reaction member, and an operative position non-rotatably locking said reaction member to said stationary member; common spring means permanently tending to move said progressive clutch means from operative into inoperative position and said locking means from inoperative into operative position; and common operating means for simultaneously moving against action of said common spring means said progressive clutch means into operative position and said locking means into inoperative position, whenever desired.

GASTON FLEISCHEL.

REFERENCES CITED

The following references are of record in the file of this patent:

UNITED STATES PATENTS

| Number | Name | Date |
| --- | --- | --- |
| 680,825 | Westinghouse | Aug. 20, 1901 |
| 1,448,095 | Steele | Mar. 13, 1923 |
| 2,007,304 | Padgett | July 9, 1935 |
| 2,177,951 | Simpson | Oct. 31, 1939 |
| 2,317,423 | Vincent | Apr. 27, 1943 |
| 2,351,746 | Dreihaus | June 20, 1944 |

FOREIGN PATENTS

| Number | Country | Date |
| --- | --- | --- |
| 375,986 | France | July 27, 1907 |
| 228,516 | Switzerland | Aug. 31, 1943 |